United States Patent
Makarov et al.

(10) Patent No.: US 10,657,338 B2
(45) Date of Patent: May 19, 2020

(54) MICROWAVE ANTENNA ARRAY AND TESTBED FOR OSTEOPOROSIS DETECTION

(71) Applicant: Neva Electromagnetics, LLC, Yarmouth Port, MA (US)

(72) Inventors: Sergey N Makarov, Holden, MA (US); Gregory M Noetscher, Shrewsbury, MA (US); Viktor S Makarov, Holden, MA (US); Ara Nazarian, Wellesley, MA (US)

(*) Notice: Subject to any disclaimer, the term of this patent is extended or adjusted under 35 U.S.C. 154(b) by 0 days.

(21) Appl. No.: 15/872,324

(22) Filed: Jan. 16, 2018

(65) Prior Publication Data
US 2019/0220633 A1  Jul. 18, 2019

Related U.S. Application Data

(60) Provisional application No. 62/446,551, filed on Jan. 16, 2017.

(51) Int. Cl.
| | | |
|---|---|---|
| G06K 19/00 | (2006.01) | |
| G06K 7/10 | (2006.01) | |
| G06K 19/07 | (2006.01) | |
| H01Q 21/22 | (2006.01) | |
| H01Q 1/22 | (2006.01) | |
| H01Q 9/04 | (2006.01) | |
| H01Q 3/26 | (2006.01) | |

(52) U.S. Cl.
CPC ..... G06K 7/10366 (2013.01); G06K 19/0723 (2013.01); H01Q 1/2225 (2013.01); H01Q 3/2623 (2013.01); H01Q 9/0407 (2013.01); H01Q 21/22 (2013.01)

(58) Field of Classification Search
USPC .......... 235/435, 439, 454, 487, 492; 340/10, 340/572
See application file for complete search history.

(56) References Cited

U.S. PATENT DOCUMENTS

| | | |
|---|---|---|
| 6,285,901 B1 | 9/2001 | Taicher et al. |
| 7,601,120 B2 | 10/2009 | Moilanen et al. |
| 8,301,221 B2 | 10/2012 | DiSilvestro et al. |
| 8,449,556 B2 | 5/2013 | Roche |
| 9,589,482 B2 | 3/2017 | Baldwin et al. |
| 2006/0241377 A1 | 10/2006 | James |
| 2007/0117524 A1* | 5/2007 | Do .......................... H04B 1/44 455/83 |
| 2007/0238992 A1 | 10/2007 | Donofrio et al. |

(Continued)

FOREIGN PATENT DOCUMENTS

JP    2000245736 A    9/2009

OTHER PUBLICATIONS

Meaney et al., 3D Microwave Bone Imaging, 6th European Conference on Antennas and Propagation, Mar. 26-30, 2012.

(Continued)

*Primary Examiner* — Matthew Mikels

(57) ABSTRACT

The present invention relates to a microwave sensing device that uses antennas in the form of a 2×1 array with two radiators driven out of phase via a 180 degree power splitter for measuring a radio-frequency signal propagating through a mammalian specimen to obtain an integral estimate of bone density.

22 Claims, 7 Drawing Sheets

(56) References Cited

U.S. PATENT DOCUMENTS

| | | |
|---|---|---|
| 2010/0069782 A1* | 3/2010 | Icove .................. G01K 3/14 600/549 |
| 2010/0152584 A1 | 6/2010 | Ariav et al. |
| 2012/0296234 A1 | 11/2012 | Wilhelm et al. |
| 2013/0018240 A1 | 1/2013 | McCoy |

OTHER PUBLICATIONS

Meaney et al., Bone Dialectric Property Variation as a Function of Mineralization at Microwave Frequencies, International Journal of Biomedical Engineering, vol. 2012, Article ID 649612, 9, Jan, 16, 2012.

Meaney et al., Clinical Microwave Tomographic Imaging of the Calcaneus: A First-in-Human Case Study of Two Subjects, IEEE Transactions on Biomedical Engineering, vol. 59, No. 12, Dec. 2012.

Zhou et al., Microwave Tomographic Imaging for Osteoporosis Screening: a Pilot Clinical Study, 32nd Annual International Conference of the IEEE EMBS Buenos Aires, Argentina, Aug. 31-Sep. 4, 2010.

Golnabi et al.,Microwave Tomography for Bone Imaging, IEEE International Symposium on Biomedical Imaging, Chicago Mar. 30-Apr. 2, 2011.

* cited by examiner

MICROWAVE ANTENNA ARRAY AND TESTBED FOR OSTEOPOROSIS DETECTION

CROSS-REFERENCE TO RELATED APPLICATIONS

This application claims benefit of U.S. Provisional Application 62/446,551, filed Jan. 16, 2017. The subject matter if that application is hereby included in its entirety.

FIELD OF THE INVENTION

The present invention relates to a device and method to measure a radio-frequency signal propagating through the wrist and, based on this information, obtain an integral estimate of bone density.

BACKGROUND OF THE INVENTION

Microwave imaging of bone was introduced several years ago with the idea of its potential application as an alternative non-ionizing diagnostic method of bone health. The suggested applications attempted to restore the complete permittivity map of the bone and surrounding tissue. Due to the well-known complexity and poor spatial resolution of the standard microwave imaging setup used in these studies, no clinically applicable results have been generated to date.

In osteoporosis, bone mass decreases and pore size increases. The lost bone mass is replaced by a mixture of yellow bone marrow, with a dielectric constant that is five times less than the value for normal trabecular bone at 900 MHz, and fat, with a dielectric constant that is two times less than the value for normal trabecular bone at 900 MHz. According to the present invention, the decrease in the dielectric constant generates significantly different scattering and/or reflection of an RF signal passing through the bone. Therefore, all that may be required for osteoporosis detection is tracking of such a signal along the path through the bone instead of restoring the complete permittivity map, as previously attempted.

Accordingly, the method and device of the present invention apply a different technical approach to osteoporosis detection. Instead of a typical microwave imaging setup, the present invention comprises a simple transmitter-receiver setup including but not limited to a modern RFID reader with an on-skin reader antenna and a number of on-skin passive RFID tags surrounding the bone in the form of an array. The novel design of the present invention eliminates the need for a custom beamforming network and will reduce both the cost and the complexity by an order of magnitude.

SUMMARY OF THE INVENTION

The present invention provides a specialized transmitter antenna for a microwave sensing device comprising at least two patch radiators forming a 2×1 transmit antenna array with at least two radiators driven out of phase via a 180 degree power splitter. In a preferred embodiment, the 2×1 patch antenna array is printed on 128 mil FR4, however, any acceptable material may be used. Two antiphase radiators provide greater penetration depth and return signal than one single antenna. The 2×1 patch antenna array of the present invention may be a transmit array or a receive array.

In a preferred embodiment the 2×1 patch antenna array is used with a testbed to measure radio-frequency signal propagating through the bone of a mammalian specimen, preferably the wrist or the ankle or the hip, however any bone may be used for testing. In the preferred embodiment, the testbed comprises an enclosure comprising a top, bottom, first side and second side. The enclosure is preferably made of acrylic glass, including, but not limited to poly methyl(methacrylate), modified poly (methyl methacrylate), or any similar thermoplastic or polymer. The enclosure for wrist measurement further comprises forearm through holes in the first and second side and a forearm guider attached to the outside of the enclosure. A grip may be used to fix the arm position for testing. Alternative embodiments include, but are not limited to, testbeds comprising only a top and bottom and testbeds with four sides and a top and bottom.

In a further embodiment, the enclosure is adjustable such that the 2×1 patch antenna array and the top and/or any sensor or testing device on the top is in contact with the specimen in the enclosure. In a preferred embodiment, the top is moveable and includes pressure sensors on the interior such that the top and bottom of the wrist to be tested are in pressure-controlled contact with the 2×1 patch antenna array and the top and/or the pressure sensors. However, it is understood that alternative methods may be used to adjust the distance between the top and bottom of the enclosure such as the bottom or sides being adjustable. The pressure sensors or force sensors and are preferably ultra-thin and are connected to a pressure sensor controller via wired or wireless technology. In a preferred embodiment, the pressure sensors are embedded, attached or connected to a mount that may be removable and/or adjustable. The mount is attached and/or connected to the interior of the top and may be removable or adjustable.

In a further embodiment, the enclosure comprises a means for adjusting the enclosure. In a preferred embodiment, there is at least one support post that extends from the bottom through the top of the enclosure. Step motors, controlled wired or wirelessly by a microcontroller, allow the top of the enclosure to move up and down about the support posts. Alternative means for adjusting the top and bottom of the testbed may be used, including but not limited to hydraulic means, clamps, magnets and electronic means.

In a further embodiment, the testbed further comprises the 2×1 patch antenna array located in the interior of the enclosure on the bottom. The array may be embedded within the bottom and may also be replaceable. In a further embodiment, a riser is attached to the bottom of the enclosure and is preferably at the same level as the forearm through holes. The 2×1 patch antenna array is then placed, connected or embedded, on the riser such that the forearm, or other specimen for testing, lays flat across the array. The 2×1 patch antenna array is then connected to the 180 degree wideband radio-frequency power splitter. The riser may extend the length of the bottom of the enclosure. Alternatively, the riser may include several small risers wherein one riser comprises the 2×1 patch antenna array and a separate riser or risers comprising the support post attachment and the means for adjusting the enclosure. Risers comprising the support posts and/or means for adjustment may also be attached or connected to the top of the enclosure.

In a preferred embodiment, hereinafter Method 1, the testbed further includes an RFID reader connected, wired or wirelessly, to the 180 degree power splitter. Method 1 further comprises a passive RFID tag array at 915 MHz placed on the underside of the top of the enclosure, preferably between the pressure sensors.

In the preferred embodiment of Method 1, a human wrist, or other specimen to be screened is inserted through a through hole using the forearm guide until the hand emerges from the other though hole. The wrist will preferably be resting upon the 2×1 patch transmit antenna array. The stepper motors move the top of the enclosure towards the wrist until the desired pressure level is achieved such that the 2×1 patch transmit antenna array and the RFID tag array, are tightly against the wrist surface. The pressure sensors are controlled via the microprocessor. This preferred method uses the Received Signal Strength (RSS) of the RFID tag array located at the top of the wrist, which is recorded by the 2×1 patch transmit antenna array at the bottom of the wrist. The signal travels from the 2×1 patch transmit antenna array to the tag and vice versa. Radiofrequency measurements are made and the data is collected electronically. Included in the data collection is wrist thickness measurement, which may be calculated by the vertical change in the top of the enclosure or by any other means. Upon completion, the stepper motors are moved in the opposite direction and the wrist may be removed.

In the preferred embodiment, hereinafter Method 2, the testbed of the present invention comprises connecting the 180 degree wideband radio-frequency power splitter a Network Analyzer, preferably portable, and using only the 2×1 patch transmit antenna array. Method 2 measures the reflection coefficient of the 2×1 patch transmit antenna array itself.

In the preferred embodiment of Method 2, a human wrist, or other specimen, is inserted through a through hole using the forearm guide until the hand emerges from the other though hole. The wrist will preferably be resting upon the 2×1 patch transmit antenna array. The stepper motors move the top of the enclosure towards the wrist until the desired pressure level is achieved such that the 2×1 patch transmit antenna array is tightly against the wrist surface. The pressure sensors are controlled via the microprocessor. This method of reflection coefficient is broadband and allows the measurement of antenna resonances. Radiofrequency measurements are made and the data is collected electronically. Included in the data collection is wrist thickness measurement, which may be calculated by the vertical change in the top of the enclosure or by any other means. Upon completion, the stepper motors are moved in the opposite direction and the wrist may be removed.

In a preferred embodiment, hereinafter Method 3, the testbed further includes an Network Analyzer comprising at least two ports (Port 1 and Port 2), connected, wired or wirelessly, to the 180 degree power splitter at Port 1. Method 3 further comprises a 2×1 patch receive antenna array placed on the underside of the top of the enclosure, preferably between the pressure sensors. The Network Analyzer is also connected to the 2×1 patch receive antenna array at Port 2.

In the preferred embodiment, of Method 3, a human wrist, or other specimen, is inserted through a through hole using the forearm guide until the hand emerges from the other though hole. The wrist will preferably be resting upon the 2×1 patch transmit antenna array on the bottom and the 2×1 patch receive antenna array on top. The stepper motors move the top of the enclosure towards the wrist until the desired pressure level is achieved such that the 2×1 patch transmit antenna array and the 2×1 patch receive antenna array are tightly against the wrist surface. The pressure sensors are controlled via the microprocessor. The signal travels from the 2×1 patch transmit antenna array to the 2×1 patch receive antenna array and the Network Analyzer measures the transmission coefficient of the pair. Broadband radiofrequency measurements are made and the data is collected electronically. Included in the data collection is wrist thickness measurement, which may be calculated by the vertical change in the top of the enclosure or by any other means. Upon completion, the stepper motors are moved in the opposite direction and the wrist may be removed.

In a further embodiment, Method 2 and Method 3 may be combined.

DETAILED DESCRIPTION OF THE DRAWINGS

Figure 1A:
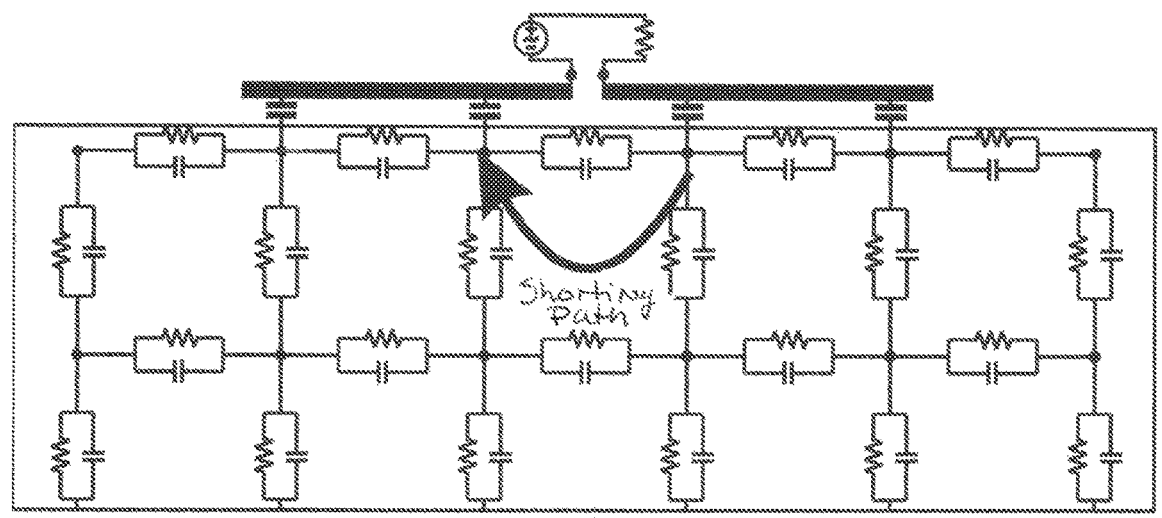
FIG. 1a is a schematic representation of a standard antenna concept close to human body.

FIG. 1a shows a printed dipole antenna, used commonly in microwave imaging, wherein the antenna suffers from a partial short at the feed due to capacitive coupling with the lossy tissue.

Figure 1B:
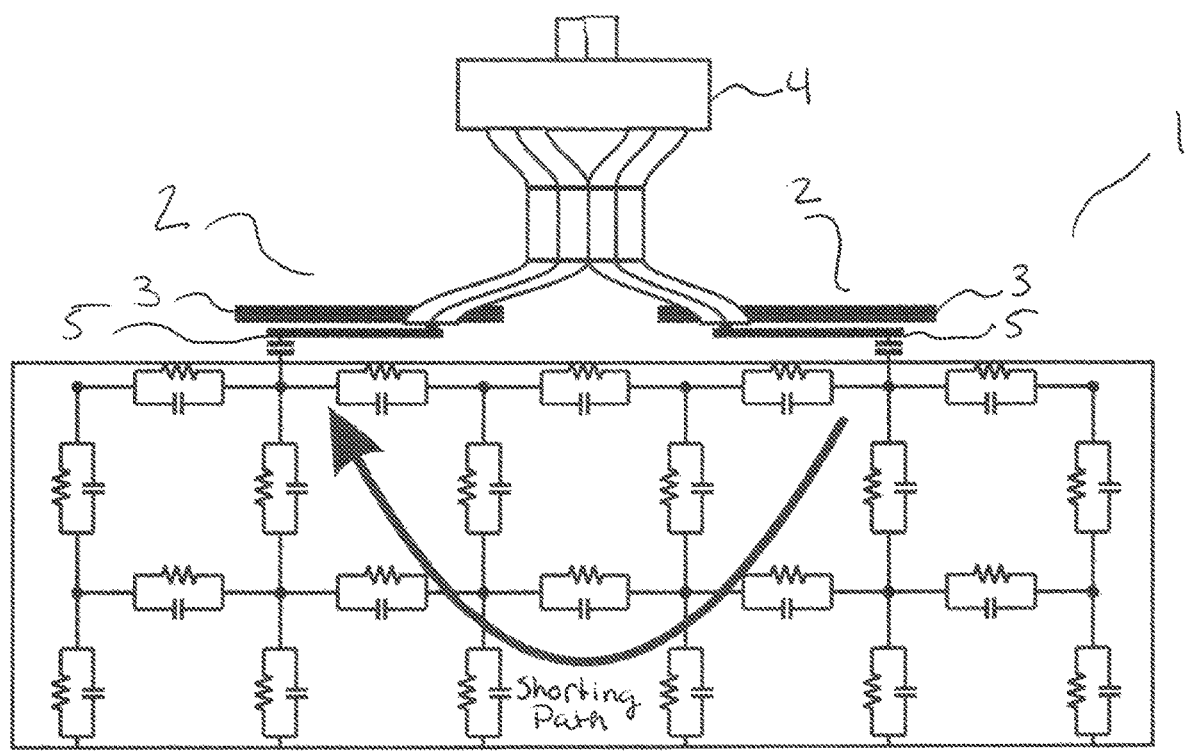
FIG. 1b is a schematic representation of the novel antenna assembly of the present invention close to human body.

FIG. 1b shows an embodiment of the present invention wherein a specialized 2×1 patch antenna array 1 is used to overcome the shortfalls of the antenna of FIG. 1a. The specialized 2×1 patch antenna array 1 is comprised of at least two printed antenna elements 2, each comprising a radiator element 5 and a ground plate 3, wherein the radiator elements are driven out of phase via a 180 degree power splitter 4.

Figure 2A:
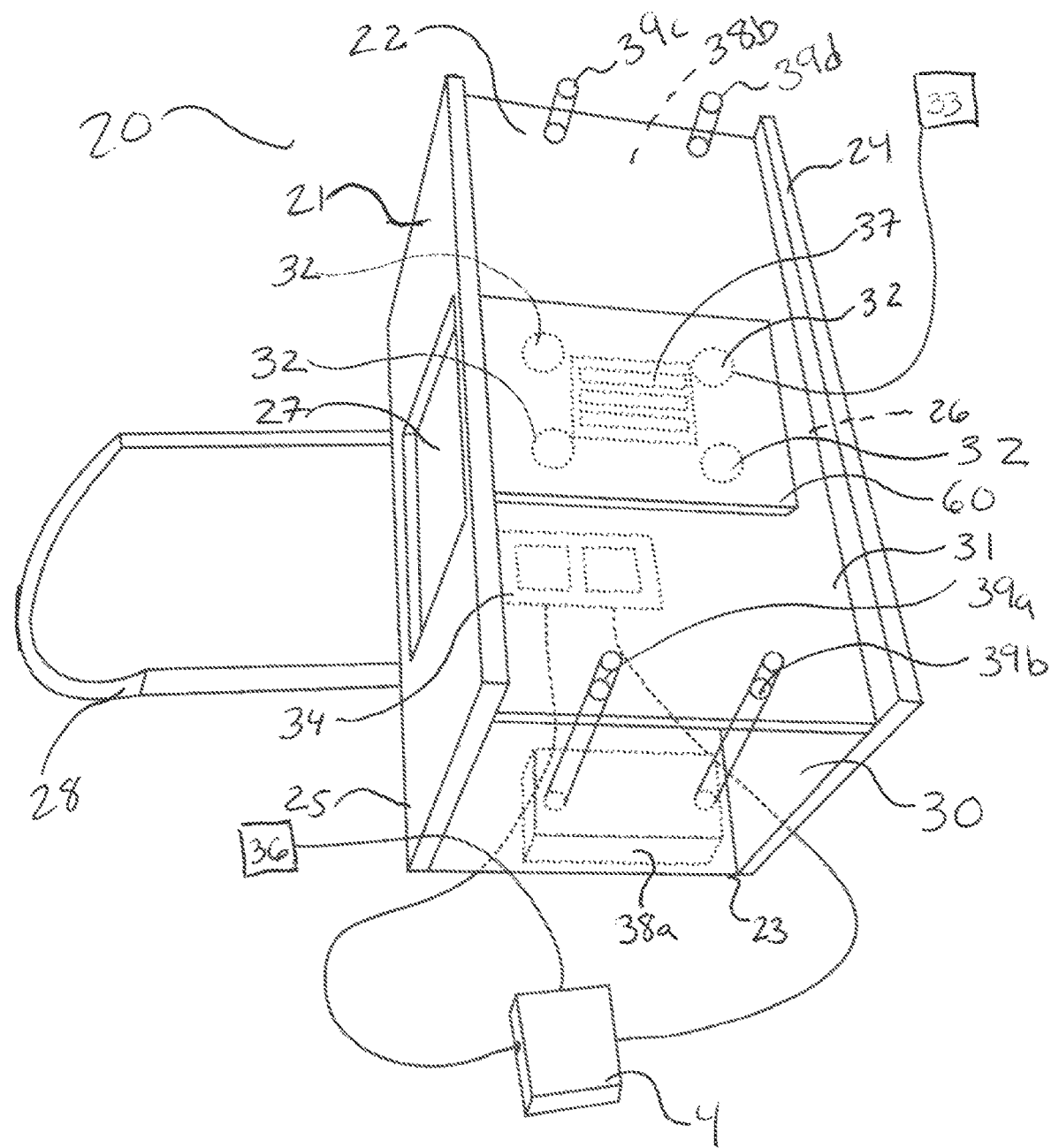
FIG. 2a is a schematic representation of Method 1 of the present invention.

FIG. 2a is a schematic representation of Method 1 for use with wrist osteoporosis detection wherein the test bed 20 is comprised of an enclosure 21. The enclosure 21 is further comprised of a top 22, bottom 23, first side 24, second side 25, and interior 30 and exterior 31. The first side 24 and second side 25 each further comprise forearm thru holes, 26 (not shown) and 27 respectively. A forearm guider 28 is located under forearm thru hole 27 and attached to the exterior 31 of enclosure 21. The enclosure 21 further comprises stepper motors (not shown) located within base 38a, controlled by microcontrollers (not shown), which allow the top 22 to move up and down in a vertical motion about top support posts 39a and 39b. In the embodiment shown, base 38b, not shown, comprises additional stepper motors (not shown), controlled by microcontrollers (not shown), which allow the top 21 to move up and down in a vertical motion about support posts 39c and 39d. Enclosure 21 further comprises pressure sensors 32 located on the interior 30 of enclosure 21 on the top 22 in between forearm thru holes 26 and 27 within upper mount 60. The pressure sensors 32 are connected to a pressure controller 33. For Method 1, the 2×1 patch antenna array 1, is a 2×1 transmit patch antenna array 34 and is located on the interior 30 of enclosure 21 on the bottom 23 in between forearm thru holes 26 and 27. The 2×1 transmit patch antenna array 34 is further connected to a 180 degree power splitter 4.

In the preferred embodiment of Method 1, the 180 degree power splitter 4 is connected to an RFID reader 36 and RFID tag array 37 is located on the interior 30 of enclosure 21 on top 22 in between the pressure sensors 32.

Figure 2B:
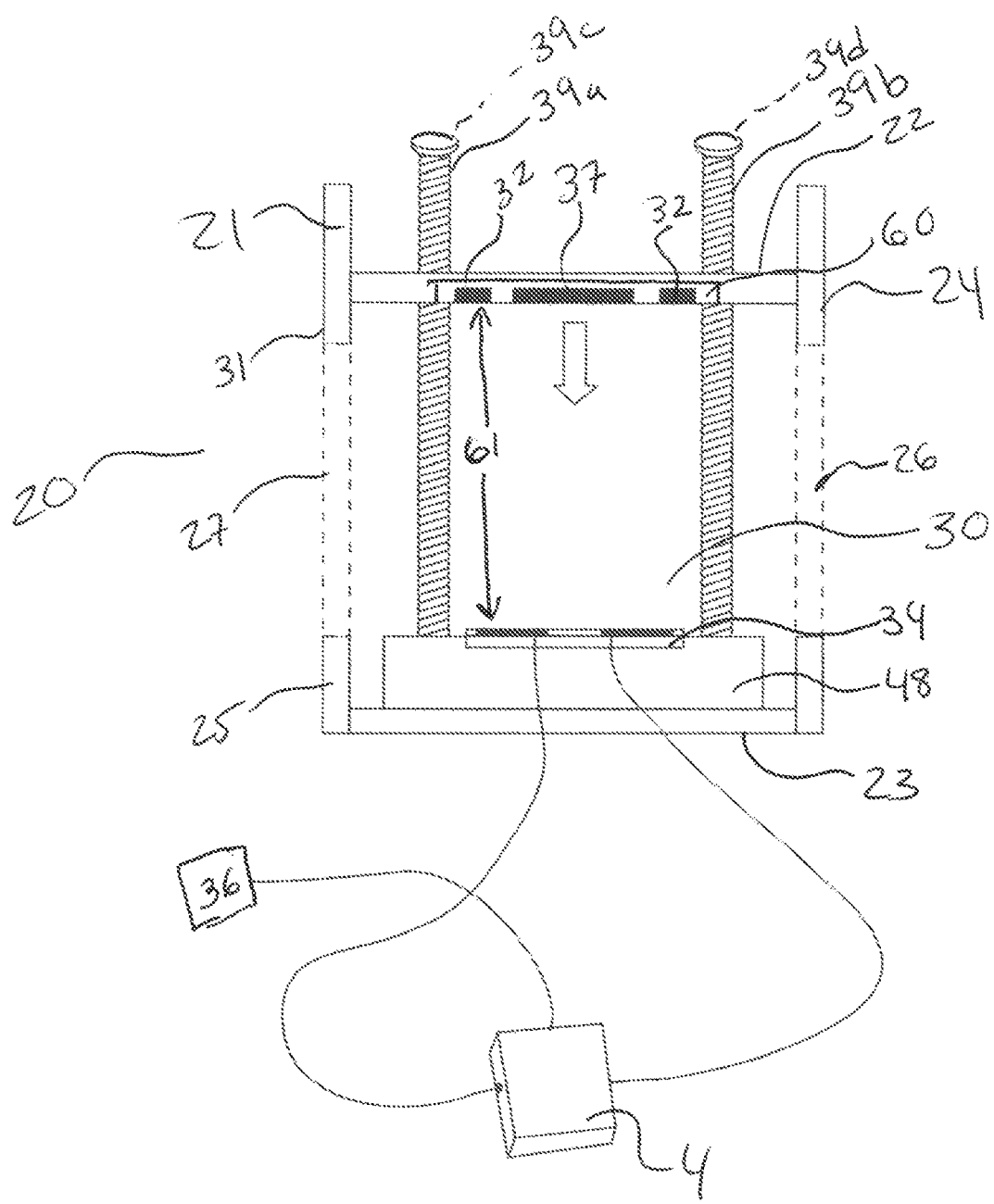
FIG. 2b is a cross-sectional schematic representation of Method 1 of the present invention.

FIG. 2b is a cross-sectional schematic representation of the preferred embodiment of Method 1 wherein the pressure sensors 32 and RFID tag array 37 are located on the interior 30 of enclosure 21 on top 22, within upper mount 60. In the embodiment shown in FIG. 2b, base 48 extends the length of the bottom 23 of enclosure 21. Base 48 further comprises stepper motors, not shown, controlled by a microcontroller, not shown, that allows the top 22 of enclosure 21 to move in a vertical manner about posts 39a, 39b, 39c (not shown) and 39d (not shown) to adjust the test space 61. In a preferred embodiment, the 2×1 transmit patch antenna array 34 may be placed on base 48 so that the 2×1 transmit patch antenna array 34 is level to the first and second side thru holes, 26 and 27. The 2×1 transmit patch antenna array 34 is connected to 180 degree power splitter 4, which in the embodiment of Method 1 is connected to RFID reader 36.

Figure 3A:
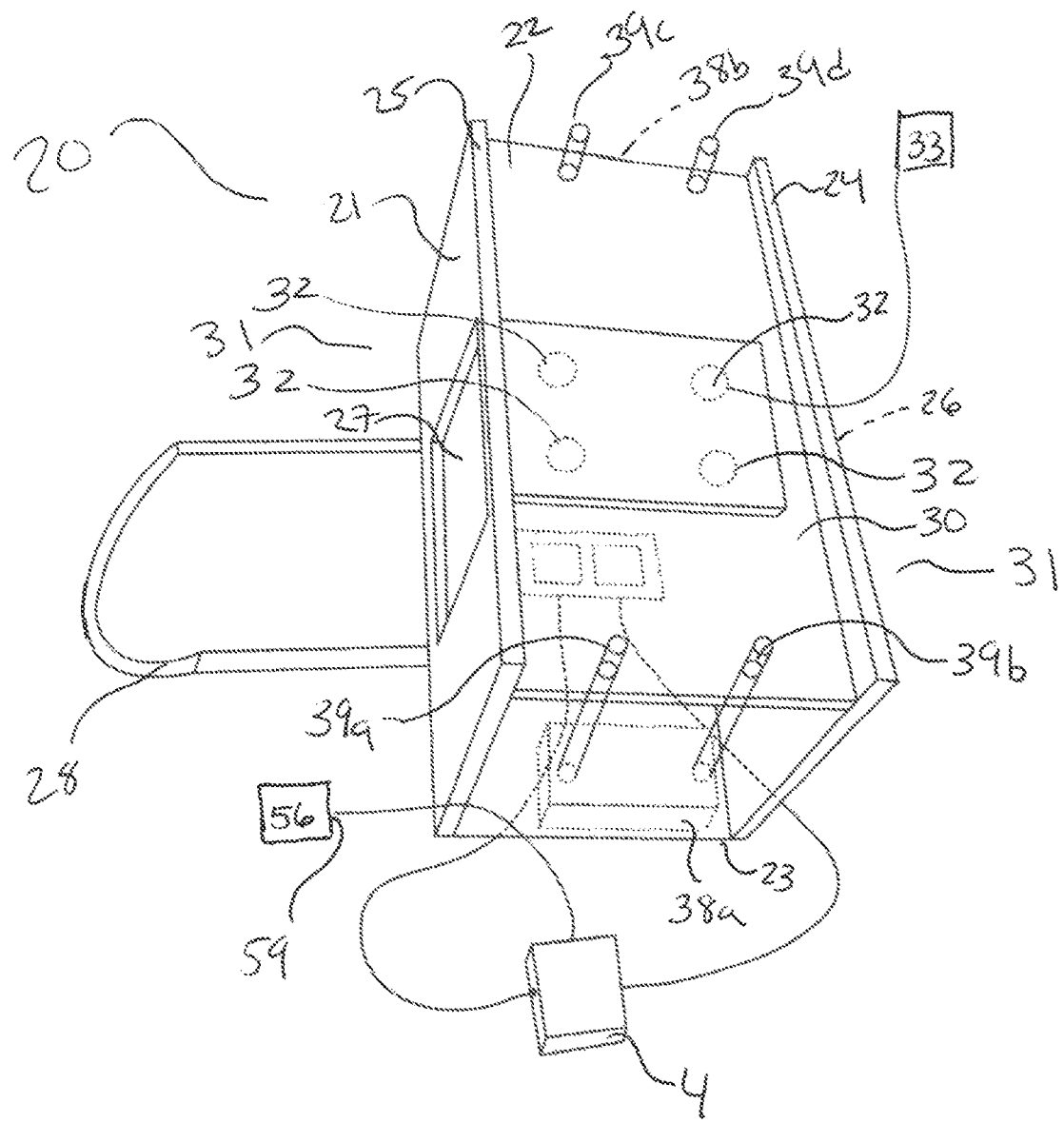
FIG. 3a is a schematic representation of Method 2 of the present invention.

FIG. 3a is a schematic representation of Method 2 for use with wrist osteoporosis detection wherein the test bed 20 is comprised of an enclosure 21. The enclosure 21 is further comprised of a top 22, bottom 23, first side 24, second side 25, and interior 30 and exterior 31. The first side 24 and second side 25 each further comprise forearm thru holes, 26 (not shown) and 27 respectively. A forearm guider 28 is located under forearm thru hole 27 and attached to the exterior 31 of enclosure 21. The enclosure 21 further comprises stepper motors (not shown) located within base 38a, controlled by microcontrollers (not shown), which allow the top 22 to move up and down in a vertical motion about top support posts 39a and 39b. In the embodiment shown, base 38b, not shown, comprises additional stepper motors (not shown), controlled by microcontrollers, not shown, which allow the top 21 to move up and down in a vertical motion about support posts 39c and 39d. Enclosure 21 further comprises pressure sensors 32 located on the interior 30 of enclosure 21 on the top 22 in between forearm thru holes 26 and 27 within upper mount 60. The pressure sensors 32 are connected to a pressure controller 33. For Method 2, the 2×1 patch antenna array 1 is a 2×1 transmit patch antenna array 34 and is located on the interior 30 of enclosure 21 on the bottom 23 in between forearm thru holes 26 and 27. The 2×1 transmit patch antenna array 34 is further connected to a 180 degree power splitter 4.

In the preferred embodiment of Method 2, the 180 degree power splitter 4 is connected to Network Analyzer 56 at Port 1 59.

Figure 3B:
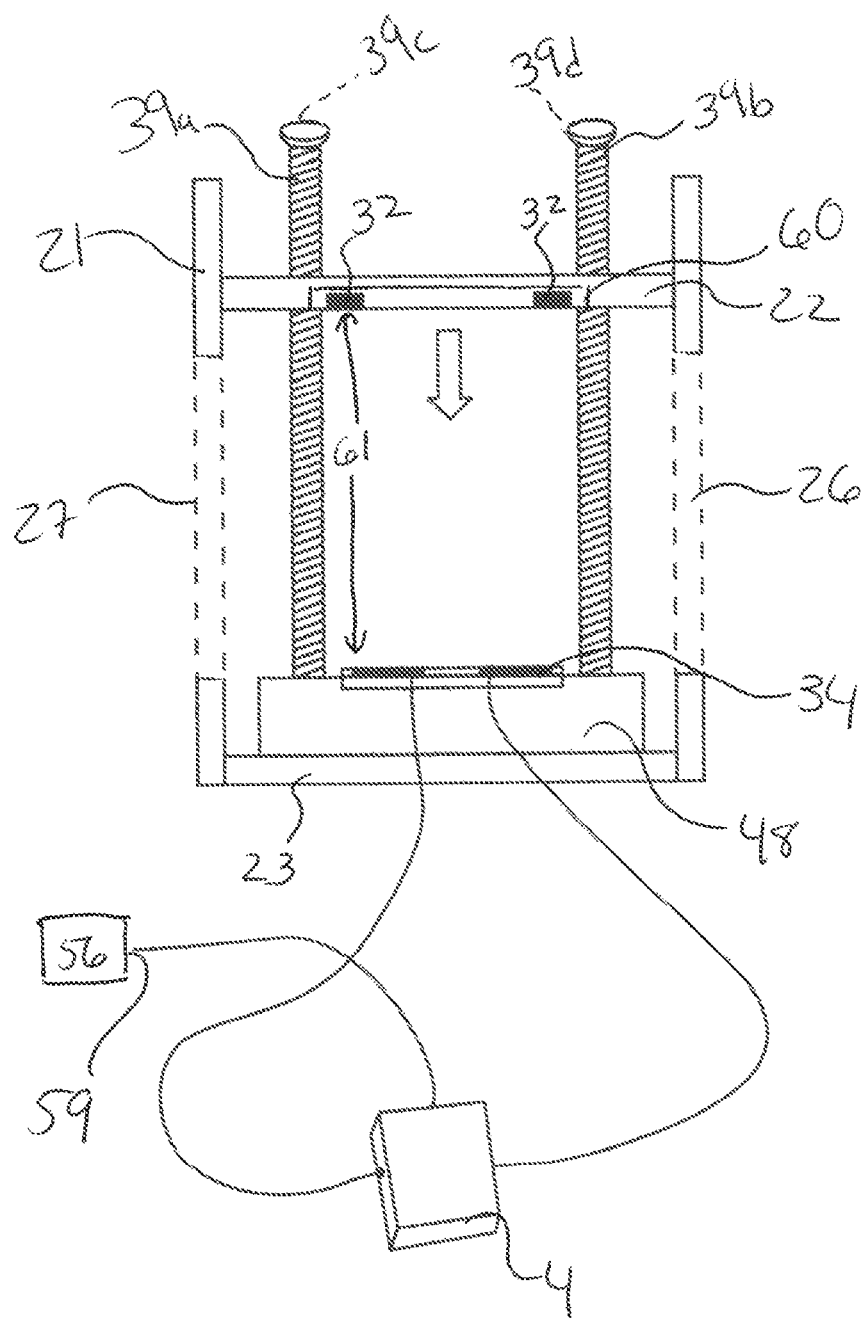
FIG. 3b is a cross-sectional schematic representation of Method 2 of the present invention.

FIG. 3b is a cross-sectional schematic representation of the preferred embodiment of Method 2 wherein the pressure sensors 32 are located on the interior 30 of enclosure 21 on top 22, within upper mount 60. In the embodiment shown in FIG. 3b, base 48 extends the length of the bottom 23 of enclosure 21. Base 48 further comprises stepper motors (not shown), controlled by a microcontroller (not shown) that allow the top 22 of enclosure 21 to move in a vertical manner about posts 39a, 39b, 39c (not shown) and 39d (not shown) to adjust the test space 61. In a preferred embodiment, the 2×1 transmit patch antenna array 34 may be placed on base 48 so that the 2×1 antenna array 34 is leveled to the first and second side thru holes, 26 and 27. The 2×1 transmit patch antenna array 34 is connected to 180 degree power splitter 4, which in the embodiment of Method 2 is connected to a Port 1 59 of Network Analyzer 56.

Figure 4A:
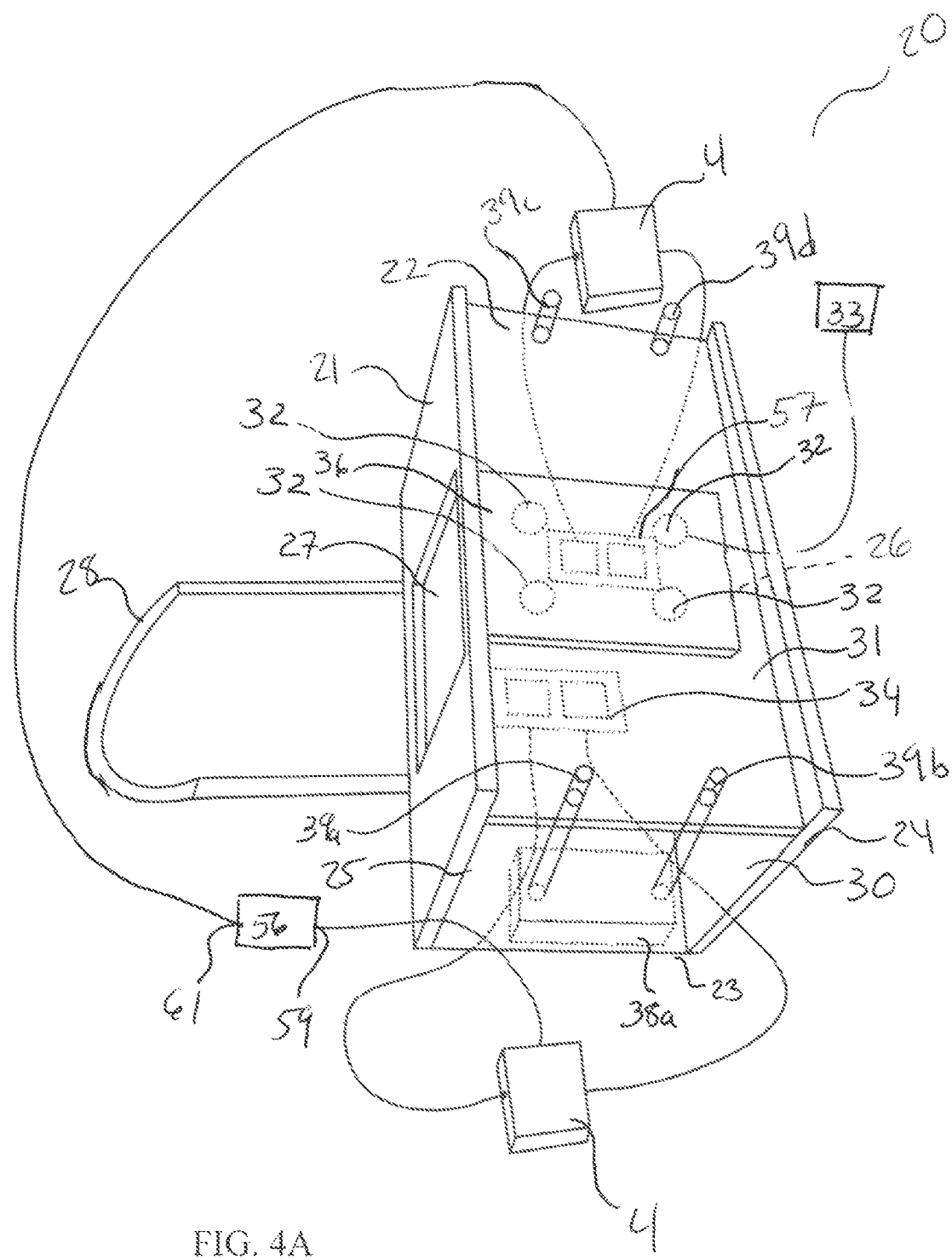
FIG. 4a is a schematic representation of Method 3 of the present invention.

FIG. 4a is a schematic representation of Method 3 for use with wrist osteoporosis detection wherein the test bed 20 is comprised of an enclosure 21. The enclosure 21 is further comprised of a top 22, bottom 23, first side 24, second side 25, and interior 30 and exterior 31. The first side 24 and second side 25 each further comprise forearm thru holes, 26 (not shown) and 27 respectively. A forearm guider 28 is located under forearm thru hole 27 and attached to the exterior 31 of enclosure 21. The enclosure 21 further comprises stepper motors (not shown) located within base 38a, controlled by microcontrollers (not shown), which allow the top 22 to move up and down in a vertical motion about top support posts 39a and 39b. In the embodiment shown, base 39b (not shown) comprises additional stepper motors (not shown), controlled by microcontrollers, not shown, which allow the top 21 to move up and down in a vertical motion about support posts 39c and 39d. Enclosure 21 further comprises pressure sensors 32 located on the interior 30 of enclosure 21 on the top 22 in between forearm thru holes 26 and 27 within upper mount 60. The pressure sensors 32 are connected to a pressure controller 33. In Method 3, the 2×1 patch antenna is a 2×1 transmit patch antenna array 34 and a 2×1 receive patch antenna array 57. The 2×1 transmit patch antenna array 34 is located on the interior 30 of enclosure 21 on the bottom 23 in between forearm thru holes 26 and 27.

In the preferred embodiment of Method 3, the 2×1 transmit patch antenna array 34 is connected to Port 59 of Network Analyzer 56 through a 180 degree power splitter 4. The 2×1 receive patch antenna array 57 is located on the interior 30 of enclosure 21 on top 22 in between the pressure sensors 32. The 2×1 receive antenna array 57 is connected to Port 2 61 of Network Analyzer 56 through a 180 degree power splitter 4.

Figure 4B:
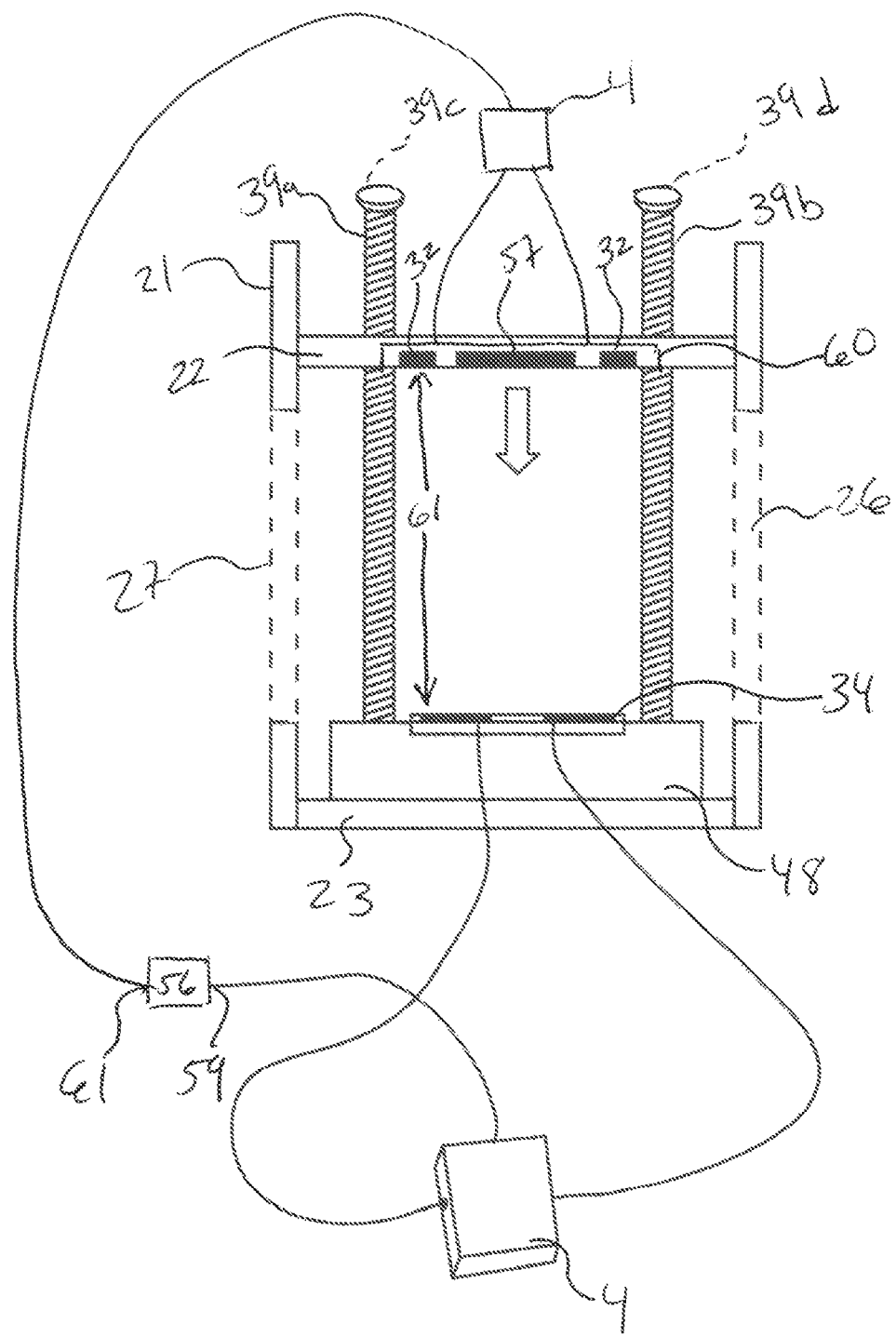
FIG. 4b is a cross-sectional schematic representation of Method 3 of the present invention.

FIG. 4b is a cross-sectional schematic representation of the preferred embodiment of Method 3 wherein pressure sensors 32 and 2×1 receive patch antenna array 57 are located on the interior 30 of enclosure 21 on top 22, within upper mount 60. The 2×1 receive patch antenna array 57 is further connected to 180 degree power splitter 4, which is then connected to Port 2 61 of Network Analyzer 56. In the embodiment shown in FIG. 4b, base 48 extends the length of the bottom 23 of enclosure 21. Base 48 further comprises stepper motors (not shown) controlled by a microcontroller, not shown, that allow the top 22 of enclosure 21 to move in a vertical manner about posts 39a, 39b, 39c (not shown) and 39d (not shown) to adjust the test space 61. In a preferred embodiment, the 2×1 antenna array 34 may be placed on base 48 so that the 2×1 transmit patch antenna array 34 is level to the first and second side thru holes, 26 and 27. The 2×1 transmit patch antenna array 34 is connected to 180 degree power splitter 4, which in the embodiment of Method 3 is connected to Port 1 59 of Network Analyzer 56. Thru holes 26 and 27 are shown in FIG. 4b.

We claim:

1. A microwave sensing device comprising:
   at least one 2×1 transmitting antenna array assembly comprising:
      at least a first and second antenna, wherein each antenna further comprises:
         a radiator element, and
         a ground element, and
      a 180° power splitter, wherein the radiator of the first antenna and the radiator of the second antenna are driven out of phase by the 180° power splitter.

2. The device of claim 1 further comprising a testbed, wherein the testbed further comprises:
   a top, comprising a top exterior and a top interior,
   a bottom, comprising a bottom exterior and a bottom interior,
   a test space, wherein the test space is an area between the top interior and the bottom interior, an attachment means, wherein the top and the bottom are coupled to the attachment means.

3. The device of claim 2 further comprising a means for adjusting the test space.

4. A microwave sensing device comprising:
at least one 2×1 transmitting antenna array assembly comprising:
at least a first and second antenna wherein each antenna further comprises:
a radiator element, and
a ground element, and
a 180° power splitter, wherein the radiator of the first antenna and the radiator of the second antenna are driven out of phase by the 180° power so litter,
a Network Analyzer connected to the 180° power splitter, wherein the Network Analyzer further comprises a first port and a second port and the power splitter is connected to the first port,
a testbed, wherein the testbed further comprises:
a top, comprising a top exterior and a top interior,
a bottom, comprising a bottom exterior and a bottom interior,
a test space, wherein the test space is an area, between the top interior and the bottom interior,
an attachment means, wherein the top and the bottom are coupled to the attachment means.

5. The device of claim 4 further comprising a means for adjusting the test space.

6. A microwave sensing device comprising:
at least one 2×1 transmitting antenna array assembly comprising:
at least a first and second antenna, wherein each antenna further comprises:
a radiator element, and
a ground element, and
a 180° power splitter, wherein the radiator of the first antenna and the radiator of the second antenna are driven out phase by the 180° power splitter,
a testbed, wherein the testbed further comprises:
at top, comprising a top exterior and a top interior,
a bottom, comprising a bottom exterior and a bottom interior,
a test space, wherein the test space is an area between the to interior and the bottom interior,
an attachment means, wherein the top and the bottom are coupled to the attachment means, further comprising:
an RFID reader connected to the 180° power splitter, and
an RFID tag array located on the top interior.

7. The device of claim 6 further comprising a means for adjusting the test space.

8. The device of claim 4 further comprising a 2×1 receive antenna array located on the top interior, wherein the receive antenna is connected to the second port of Network Analyzer.

9. The device of claim 5 further comprising a 2×1 receive antenna array located on the top interior, herein the receive antenna is connected to the second port of the Network Analyzer.

10. The device of claim 5 further comprising:
a plurality of pressure sensors located on the top interior, and
a control mechanism for the pressure sensors.

11. The device of claim 7 further comprising:
a plurality of pressure sensors located on the top interior, and
a control mechanism for the pressure sensors.

12. The device of claim 9 further comprising:
a plurality of pressure sensors located on the top interior, and
a control mechanism for the pressure sensors.

13. A microwave sensing device comprising:
at least one 2×1 transmitting antenna array assembly comprising:
at least a first and second antenna, wherein each antenna further comprises:
a radiator element, and
a ground element, and
a 180° power splitter, wherein the radiator of the first antenna and the radiator of the second antenna are driven out of phase by the 180° power splitter,
a testbed, wherein the testbed further comprises:
a top, comprising a top exterior and a top interior,
a bottom, comprising a bottom exterior and a bottom interior,
a test space, wherein the test space is an area between the top interior and the bottom interior,
an attachment means, wherein the top and the bottom are coupled to the attachment means,
a means for adjusting the test space,
wherein the attachment means comprises at least one support post and the means for adjusting the test space comprises at least one step motor.

14. The device of claim 2 further comprising:
an RFID reader connected to the 180° power splitter,
a receiving RFID tag array, wherein the RFID reader and receiving RFID tag array are located within the interior of the test space and one is located on the top interior and one is located on the bottom interior.

15. The device of claim 2 further comprising:
a Network Analyzer connected to the 180° power splitter, wherein the Network Analyzer further comprises a first port and a second port; and the 2×1 transmitting antenna array assembly is connected through the 180° power splitter to the first port of the Network Analyzer.

16. The device of claim 15 further comprising:
a 2×1 receiving antenna array assembly,
wherein the 2×1 receiving antenna array assembly is connected through a second 180° power splitter to the second receiving port of the Network Analyzer.

17. The device of claim 14 further comprising:
a plurality of pressure sensors located on the top interior, and a control mechanism for the pressure sensors.

18. The device of claim 15 further comprising:
a plurality of pressure sensors located on the top interior, and a control mechanism for the pressure sensors.

19. The device of claim 16 further comprising:
a plurality of pressure sensors located on the top interior, and a control mechanism for the pressure sensors.

20. The device of claim 15 wherein the attachment means comprises at least one support post and the means for adjusting the test space comprises at least one stepper motor.

21. A method for bone density detection comprising the device of claim 4 comprising placing a mammalian limb in the testbed and recording a plurality of radio-frequency measurements to a data collection system.

22. A method for hone density detection comprising the device of claim 14 comprising placing a mammalian limb in the testbed and recording a plurality of radio-frequency measurements to a data collection system.

* * * * *